US008825030B2

(12) United States Patent
Xu

(10) Patent No.: US 8,825,030 B2
(45) Date of Patent: Sep. 2, 2014

(54) WIRELESS COMMUNICATION DEVICE AND METHOD FOR SWITCHING ALERT MODES OF THE WIRELESS COMMUNICATION DEVICE

(75) Inventor: Xin Xu, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 0 days.

(21) Appl. No.: 13/571,360

(22) Filed: Aug. 10, 2012

(65) Prior Publication Data

US 2013/0210410 A1    Aug. 15, 2013

(51) Int. Cl.
*H04W 8/22*    (2009.01)
(52) U.S. Cl.
USPC .......................................... 455/418; 455/456.4
(58) Field of Classification Search
USPC .................. 455/41.1, 418, 456.4, 550.1, 567
See application file for complete search history.

(56) References Cited

U.S. PATENT DOCUMENTS

2005/0170849 A1*  8/2005  McClelland ............... 455/456.4
2010/0099354 A1*  4/2010  Johnson ...................... 455/41.1

* cited by examiner

*Primary Examiner* — Myron K Wyche
(74) *Attorney, Agent, or Firm* — Novak Druce Connolly Bove + Quigg LLP

(57) ABSTRACT

A wireless communication device receives a message periodically broadcast by a wireless broadcast device placed within a location, and determines a type of the location and a broadcast period of the message. The wireless communication device sets a check period for periodically checking whether the wireless communication device receives the message, and checks if a present alert mode of the wireless communication device is suitable for the type of the location in a present check period. When the present alert mode of the wireless communication device is not suitable, the wireless communication device automatically switches the present tone mode to a new tone. When the wireless communication device does not receive the message within a next check period, the wireless communication device is determined as having left the location and automatically switched back to the present alert mode from the new alert mode.

15 Claims, 3 Drawing Sheets

WIRELESS COMMUNICATION DEVICE AND METHOD FOR SWITCHING ALERT MODES OF THE WIRELESS COMMUNICATION DEVICE

BACKGROUND

1. Technical Field

The embodiments of the present disclosure relate to wireless communication systems and methods, and particularly to a wireless communication device and a method for switching alert modes of the wireless communication device.

2. Description of Related Art

Wireless communication devices, such as mobile phones, are very convenient. However, in some situations, a wireless communication device may cause trouble. For example, if a user attends an important meeting and forgets to switch his/her mobile phone to a vibration mode or a silent mode, an incoming call may interfere with the meeting. If the user forgets to turn off the mobile phone or switch the mobile phone to a flight mode on an airplane, the mobile phone may interfere with flight of the airplane.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean "at least one".

In general, the word "module", as used herein, refers to logic embodied in hardware or firmware, or to a collection of software instructions, written in a programming language. One or more software instructions in the modules may be embedded in firmware, such as in an erasable programming read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
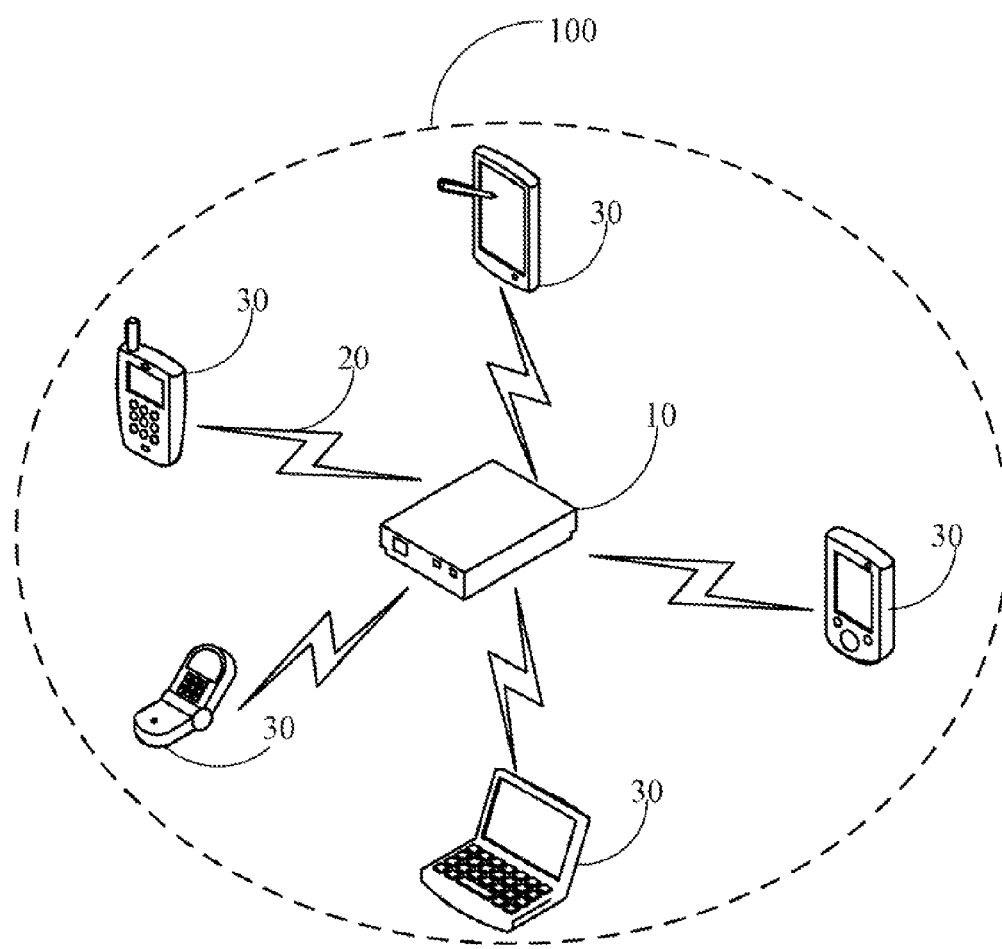
FIG. 1 is a schematic diagram of one embodiment of an application environment of a wireless communication device.

FIG. 1 is a schematic diagram of one embodiment of an application environment of a wireless communication device 30. The wireless communication device 30 communicates with a wireless broadcast device 10 (e.g., a wireless router) via a wireless network 20. In this embodiment, the wireless broadcast device 10 is placed within a location 100, such as a conference room or an aircraft cabin, and a broadcast range of signals broadcast from the wireless broadcast device 10 is limited to within the location. Depending on the embodiment, the wireless communication device 30 may be a mobile phone, a personal digital assistant, or a portable computer.

Figure 2:
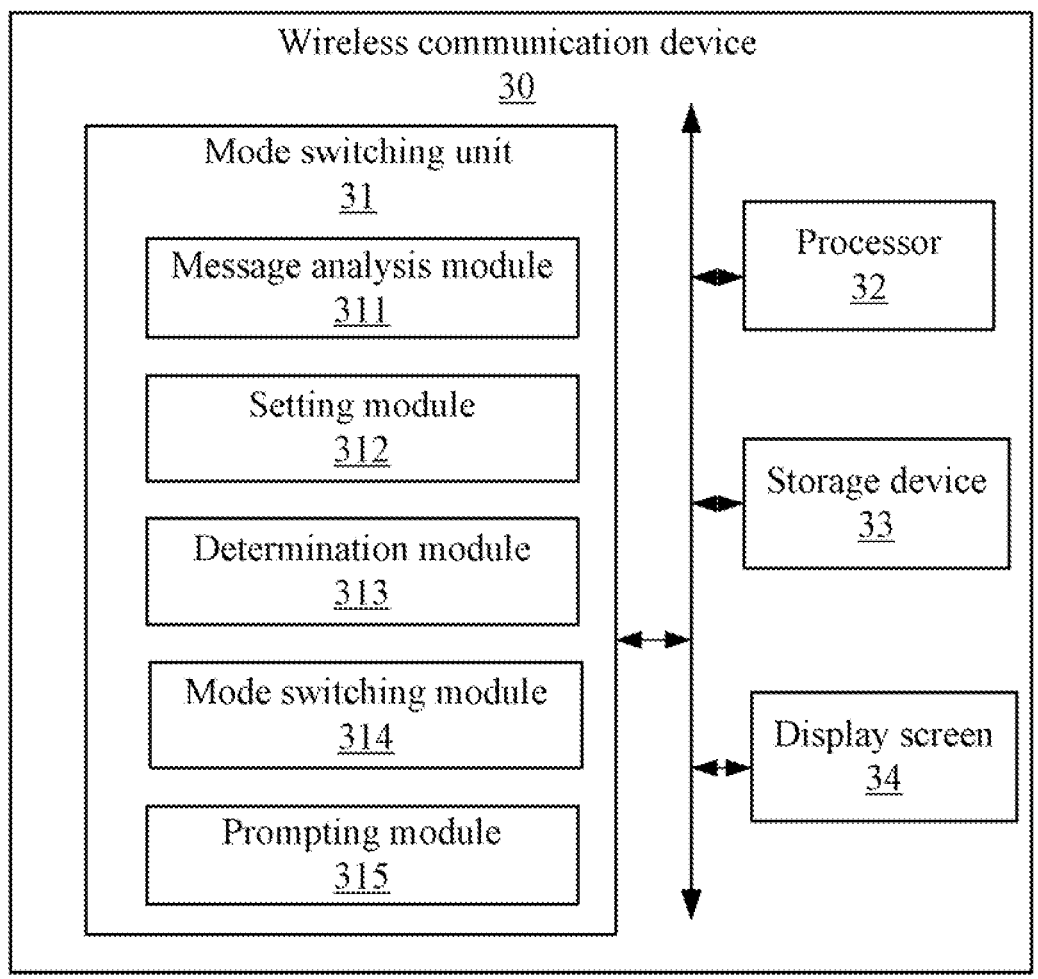
FIG. 2 is a block diagram of one embodiment of function modules of a wireless communication device.

As shown in FIG. 2, the wireless communication device 30 includes a mode switching unit 31, a processor 32, a storage device 33, and a display screen 34. When the wireless communication device 30 enters the location 100, the mode switching unit 31 receives messages broadcast by the wireless broadcast device 10, determines a type of the location 100 by analyzing the received messages, and automatically switches the wireless communication device 30 to an alert mode that is suitable for the type of the location 100. When the wireless communication device 30 leaves the location 100, the mode switching unit 31 automatically switches the wireless communication device 30 to a previous alert mode of the wireless communication device 30. In this embodiment, the type of the location 100 may be a conference environment or an airplane environment, for example.

In one embodiment, the mode switching unit 31 includes a message analysis module 311, a setting module 312, a determination module 313, a mode switching module 314, and a prompting module 315. The modules 311-315 may include computerized code in the form of one or more programs (computer-readable program code) that are stored in the storage device 33. The computerized code includes instructions that are executed by the processor 32 to provide the functions of the mode switching unit 31 as described above. The storage device 33 is a dedicated storage medium, such as an EPROM, a hard disk driver (HDD), or a flash memory. A description of functions of the modules 311-315 is given below in the descriptions regarding FIG. 3.

Figure 3:
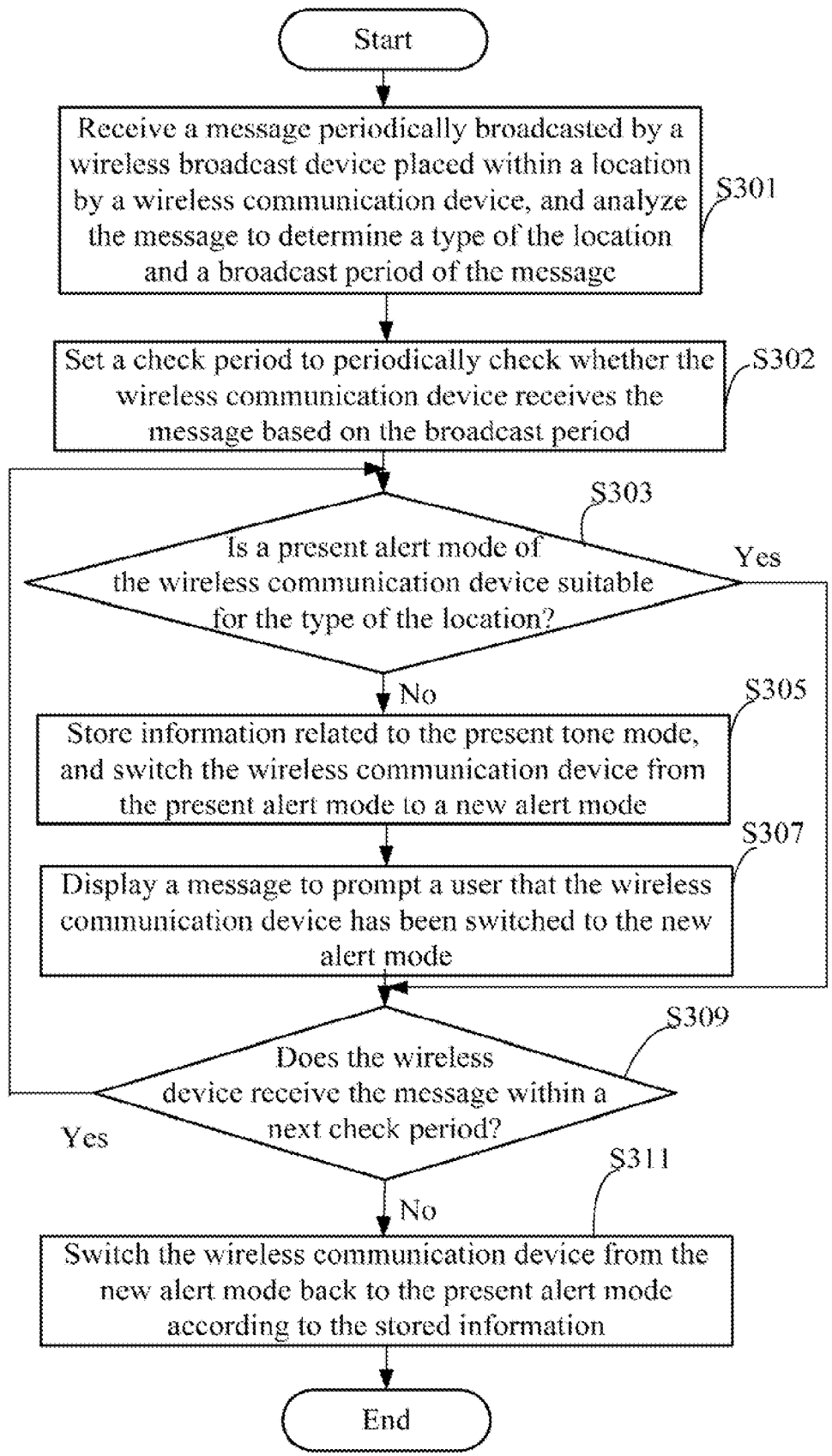
FIG. 3 is a flowchart of one embodiment of a method for switching alert modes of a wireless communication device.

FIG. 3 is a flowchart of one embodiment of a method for switching alert modes of the wireless communication device 30. Depending on the embodiment, additional steps may be added, others removed, and the ordering of the steps may be changed.

In step S301, the wireless communication device 30 enters in the location 100, the message analysis module 311 receives a message periodically broadcast by the wireless broadcast device 10 placed within the location 100, and analyzes the message to determine a type of the location 100 and a broadcast period of the message. The broadcast period means a period of broadcasting the message. In this embodiment, the message is a text message based on a simple service discovery protocol (SSDP). The message includes a standard SSDP message header, a multicast address and a port number of the wireless broadcast device 10, an extended message header and a message body. For example, the standard SSDP message header may be "NOTIFY*HTTP/1.1\r\n", the multicast address and the port number of the wireless broadcast device 10 may be "HOST: 239.255.255.250:1900", where "239.255.255.250" is the multicast address and "1900" is the port number.

The extended message header contains information related to the location 100, such as a type of the location 100 and a provider and/or a lessee of the location 100. The message body contains a broadcast period of the message and a description of activities conducted in the location 100. For example, the extended message header may be "MEETING.id.xyz.com: 'meeting'", where "MEETING.id" and the value "meeting" indicate the location 100 is the conference location, and "foxconn.com" is the domain name of the conductor of the conference. The message body may include "MEETING.timeout.xyz.com: '60 s'" and "MEETING.desc.foxconn.com: 'short description'", which indicates that the wireless broadcast device 100 broadcasts the message every sixty seconds in the conference location and a short description of the conference is included.

In step S302, the setting module 312 sets a check period to periodically check whether the wireless communication device 30 receives the message based on the broadcast period of the message. In this embodiment, the check period is equal to or more than the broadcast period. For example, in this embodiment, the check period may be set as 60 s (or more than 60 s), so that the mode switching unit 31 checks whether the wireless communication device 30 receives the message every sixty seconds after the first time that the message has been received.

In step S303, the determination module 313 checks if a present alert mode of the wireless communication device 30 is suitable for the type of the location 100 after the wireless communication device receives the message in a present check period. It is noted that the present check period is timing when the message has been received at the first time. For example, if the location 100 is the conference location, the determination module 313 checks if the present alert mode of the wireless communication device 30 is in a vibration mode or a silent mode. If the location 100 is the airplane environment, the determination module 313 checks if the present alert mode of the wireless communication device 30 is in a flight mode or is turned off. If the present alert mode of the wireless communication device 30 is suitable for the type of the location 100, the procedure goes to step S309. Otherwise, if the present alert mode of the wireless communication device 30 is not suitable for the type of the location 100, step S305 is implemented.

In step S305, the mode switching module 314 stores information related to the present alert mode, such as an audible manner (e.g., a continuous ring, a progressive ring, or a buzz), music selected as the ring, and volume of the ring, into the storage device 33. The mode switching module 314 switches the present alert mode to a new alert mode that is suitable for the location type. For example, when the location 100 is the conference location and the present alert mode is an audible mode, the mode switching module 314 switches the audible mode to a vibration mode or a silent mode.

In step S307, the prompting module 315 displays a message on the display screen 34 to warn a user that the wireless communication device 30 has been switched to the new alert mode. For example, after the wireless communication device 30 has been switched from the audible mode to the silent mode, the prompting module 315 may display a message "For your information: the device has been switched to a silent mode!" on the display screen 34.

In step S309, the determination module 313 checks if the wireless communication device 30 receives the message periodically broadcast by the wireless broadcast device 10 in a next check period. If the wireless communication device 30 receives the message periodically broadcast by the wireless broadcast device 10 within the next check period, the wireless communication device 30 is regarded as remaining within the location 100, then the procedure returns to step S303. If the wireless communication device 30 does not receive the message periodically broadcast by the wireless broadcast device 10 within the next check period, the wireless communication device is regarded as having left the location 100, then step S311 is implemented.

In step S311, the mode switching module 313 switches the wireless communication device 30 from the new alert mode back to the present alert mode according to the stored information related to the present alert mode. For example, after the wireless communication device 30 has left the conference location, the mode switching module 313 switches the wireless communication device 30 from the silent mode back to the audible mode. The prompting module 315 may further display a message on the display screen 34 to warn the user that the wireless communication device 30 has been switched back to a previous mode. For example, after the wireless communication device 30 has been switched back to the audible mode, the prompting module 315 may display a message "For your information: the device has been switched back to the audible mode!" on the display screen 34.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method being executed by a processor of a wireless communication device, the method comprising:
   receiving a message periodically broadcast by a wireless broadcast device placed within a location when the wireless communication device enters the location, and determining a type of the location and a broadcast period of the message by analyzing the message;
   setting a check period for periodically checking whether the wireless communication device receives the message based on the broadcast period of the message;
   checking if a present alert mode of the wireless communication device is suitable for the type of the location after the wireless communication device receives the message in a present check period; and
   automatically switching the wireless communication device from the present alert mode to a new alert mode that is suitable for the location type, in response that the present alert mode of the wireless communication device is not suitable for the type of the location.

2. The method of claim 1, wherein the check period is equal to or more than the broadcast period of the message.

3. The method of claim 1, after the switching step further comprising:
   displaying a message on a display screen of the wireless communication device to prompt a user that the wireless communication device has been switched to the new alert mode.

4. The method of claim 1, before the switching step further comprising:
   storing information related to the present alert mode into a storage device of the wireless communication device.

5. The method of claim 4, after the switching step further comprising:
   checking if the wireless communication device receives the message periodically broadcast by the wireless broadcast device in a next check period; and
   automatically switching the wireless communication device from the new alert mode back to the present alert mode according to the stored information related to the present alert mode, in response that the wireless communication device does not receive the message periodically broadcast by the wireless broadcast device in the next check period.

6. A wireless communication device comprising:
   a processor;
   a storage device; and
   one or more programs stored in the storage device and executed by the processor to perform a method comprising steps of:
   receiving a message periodically broadcast by a wireless broadcast device placed within a location after the wireless communication device enters the location, and determining a type of the location and a broadcast period of the message by analyzing the message;
   setting a check period for periodically checking whether the wireless communication device receives the message based on the broadcast period of the message;
   checking if a present alert mode of the wireless communication device is suitable for the type of the location after the wireless communication device receives the message in a present check period; and automatically switching the wireless communication device from the present alert mode to a new alert mode that is suitable for the location type, in response that the present alert mode of the wireless communication device is not suitable for the type of the location.

7. The wireless communication device of claim 6, wherein the check period is equal to or more than the broadcast period of the message.

8. The wireless communication device of claim 6, wherein after the switching step the method further comprises:

displaying a message on a display screen of the wireless communication device to prompt a user that the wireless communication device has been switched to the new alert mode.

9. The wireless communication device of claim 6, wherein before the switching step the method further comprises:

storing information related to the present alert mode into a storage device of the wireless communication device.

10. The method of claim 9, wherein after the switching step the method further comprises:

checking if the wireless communication device receives the message periodically broadcast by the wireless broadcast device in a next check period; and automatically switching the wireless communication device from the new alert mode back to the present alert mode according to the stored information related to the present alert mode, in response that the wireless communication device does not receive the message periodically broadcast by the wireless broadcast device in the next check period.

11. A non-transitory storage medium storing a set of instructions, the set of instructions capable of being executed by a processor of a wireless communication device to perform a method for switching alert modes of the wireless communication device, the method comprising:

receiving a message periodically broadcast by a wireless broadcast device placed within a location after the wireless communication device enters the location, and determining a type of the location and a broadcast period of the message by analyzing the message;

setting a check period for periodically checking whether the wireless communication device receives the message based on the broadcast period of the message;

checking if a present alert mode of the wireless communication device is suitable for the type of the location after the wireless communication device receives the message in a present check period; and automatically switching the wireless communication device from the present alert mode to a new alert mode that is suitable for the location type, in response that the present alert mode of the wireless communication device is not suitable for the type of the location.

12. The medium of claim 11, wherein the check period is equal to or more than the broadcast period of the message.

13. The medium of claim 11, wherein after the switching step the method further comprises:

displaying a message on a display screen of the wireless communication device to prompt a user that the wireless communication device has been switched to the new alert mode.

14. The medium of claim 11, wherein before the switching step the method further comprises:

storing information related to the present alert mode into a storage device of the wireless communication device.

15. The medium of claim 14, wherein after the switching step the method further comprises:

checking if the wireless communication device receives the message periodically broadcast by the wireless broadcast device in a next check period; and automatically switching the wireless communication device from the new alert mode back to the present alert mode according to the stored information related to the present alert mode, in response that the wireless communication device does not receive the message periodically broadcast by the wireless broadcast device in the next check period.

\* \* \* \* \*